United States Patent [19]

De Carolis et al.

[11] Patent Number: 4,466,523

[45] Date of Patent: Aug. 21, 1984

[54] RATCHET MECHANISM

[75] Inventors: Joseph P. De Carolis, Bristol; Lawrence L. Billings, East Hartford, both of Conn.

[73] Assignee: The Stanley Works, New Britain, Conn.

[21] Appl. No.: 393,459

[22] Filed: Jun. 29, 1982

[51] Int. Cl.$^{3}$ .......................... F16D 11/06; B25B 13/46

[52] U.S. Cl. .................................. 192/43.1; 192/45.1; 81/62; 145/72

[58] Field of Search .................... 192/43.1, 45.1, 45.2; 81/62, 61; 145/72, 75, 76

[56] References Cited

U.S. PATENT DOCUMENTS

| | | | |
|---|---|---|---|
| 541,130 | 6/1895 | Swan . | |
| 1,436,640 | 11/1922 | Bleune . | |
| 1,493,353 | 5/1924 | Leopold . | |
| 2,013,765 | 9/1935 | Richardson . | |
| 2,110,099 | 3/1938 | Thewes | 192/43.1 X |
| 2,292,228 | 8/1942 | Krieger | 145/76 |
| 2,427,120 | 9/1947 | Blair | 192/43 |
| 2,737,275 | 3/1956 | Szady | 192/45.1 |
| 2,784,820 | 3/1957 | Clark | 192/43.1 X |
| 3,086,405 | 4/1963 | Fleming | 192/43.1 X |
| 3,256,966 | 6/1966 | Angquist | 81/62 X |
| 3,363,733 | 1/1968 | Titt | 192/43.1 X |
| 3,372,612 | 3/1968 | Rozmus | 81/62 |
| 3,432,015 | 3/1969 | Schwerdhöfer | 192/43.1 |
| 3,467,231 | 9/1969 | Haznar | 81/62 X |
| 3,534,836 | 10/1970 | Dane | 192/43.1 |
| 3,742,787 | 7/1973 | Whiteford | 145/75 X |
| 4,086,831 | 5/1978 | Smith | 145/75 X |
| 4,130,191 | 12/1978 | Judd et al. | 192/45.1 X |

*Primary Examiner*—Rodney H. Bonck
*Assistant Examiner*—David D. House
*Attorney, Agent, or Firm*—Prutzman, Kalb, Chilton & Alix

[57] ABSTRACT

A ratchet handle for a hand tool employs pairs of opposing pawls which are biased by a spring and selectively engage teeth at the interior of a cylindrical structure to provide for a three direction mode ratchet drive. A shifter engageable at one of three positions has ears which selectively interact with the pawls. In one embodiment three pairs of opposing pawls are biased by a garter spring. Another embodiment employs an integral serpentine spring/pawl assembly.

15 Claims, 12 Drawing Figures

RATCHET MECHANISM

BACKGROUND OF THE INVENTION

This invention relates to a ratchet handle adapted for use with a screwdriver or the like. More particularly, this invention relates to an improved ratchet handle which provides for ratchet drive rotation in three directional modes.

There are a number of prior art disclosures directed to the use of ratchet mechanisms in conjunction with hand tools—particularly wrenches which employ a handle mechanism substantially perpendicular to the axis of rotation of the tool. The use of a ratchet mechanism in conjunction with screwdrivers and similar tools entails design constraints in terms of compactness of the ratchet mechanism and provision for an efficient applicator surface which facilitates the application of rotational force to the tool.

U.S. Pat. Nos. 1,436,640, 1,493,353, 541,130 and 4,086,831 generally disclose ratchet mechanisms employing a pair of pawls engageable with teeth at the periphery of a sprocket or gear wheel to actuate the ratchet drive mechanism. U.S. Pat. Nos. 2,013,765, 3,256,966 and 3,742,787 generally disclose ratchet mechanism employing a plurality of pawls engageable with teeth circumferentially positioned around the interior of a substantially cylindrical member to actuate the ratchet drive mechanism. The foregoing prior art ratchet mechanisms provide ratchet drive rotation in two or more directional modes.

In general, prior art ratchet mechanisms are deficient in terms of requiring a relatively large quantity of individual components which must be assembled in a relatively complex and precise manner. The latter deficiency is particularly manifest in ratchet mechanisms employing a plurality of pawls each of which require a separate spring or biasing means. The corresponding manufacturing costs are frequently disproportionate to the intended application of the ratchet mechanism for use in conjunction with basic and inexpensive tools such as a screwdriver.

The present invention is a new and improved ratchet handle employing a ratchet mechanism comprising a spring/pawl assembly which, in conjunction with a shifter assembly, provides for engagement of one or more pawls with teeth circumferentially positioned at the interior of a member to produce a ratchet drive. The present invention provides an efficient means of shifting the ratchet drive to one of three drive positions, which shifting can be accomplished by use of fingers of the same hand that holds the ratchet handle, the efficiency and ease of operation of the ratchet handle are not compromised by the manufacturing advantages. Moreover, the invention comprises a pawl assembly having a plurality of pawls which may be biased in an efficient manner by means of either an integral serpentine spring pawl structure or a single garter spring arrangement.

BRIEF SUMMARY OF THE INVENTION

The invention in one form comprises a housing having a cavity partially defined by a cylindrical wall which has a plurality of longitudinally extending parallel teeth arranged around the interior periphery of the wall. An integral pawl assembly comprising three pairs of opposing pawls biased by an integral serpentine spring provides selective engagement of the pawls with the interior housing teeth. The pawl assembly is received in a hub of a drive assembly adapted to receive the shank of a screwdriver. A shifter assembly may be rotated to one of three positions relative to the drive assembly to produce engagement or disengagement of the pawls with the interior teeth of the housing. In a first position, only a clockwise rotational force applied to the housing results in a corresponding rotational force of the screwdriver; in a second position both clockwise and counterclockwise rotational forces result in corresponding rotational forces of the screwdriver; and in a third position only a counterclockwise rotational force results in a corresponding rotational force of the screwdriver.

Another form of the invention comprises a spring-/pawl assembly comprising three pairs of opposing pawls biased by a garter spring which provides selective engagement of the pawls with the interior housing teeth in a manner similar to that of the first embodiment.

An object of the invention is to provide a new and improved ratchet handle adaptable for use with a screwdriver or the like.

A further object of the invention is to provide a new and improved ratchet handle having a reverse, forward and lock ratchet drive direction mode.

A further object of the invention is to provide a new and improved ratchet handle which is relatively easy to assemble.

A further object of the invention is to provide a new and improved ratchet handle which may be operated by the user in an easy, efficient and comfortable manner.

Another object of the invention is to provide a new and improved ratchet handle whereby the shift to a different ratchet drive direction mode can be efficiently accomplished with a single hand.

Another object of the invention is to provide a new and improved ratchet handle having a spring/pawl assembly requiring a fewer number of separate components.

Other objects and advantages of the invention will become clear from the accompanying drawings and detailed description.

Figure 2:
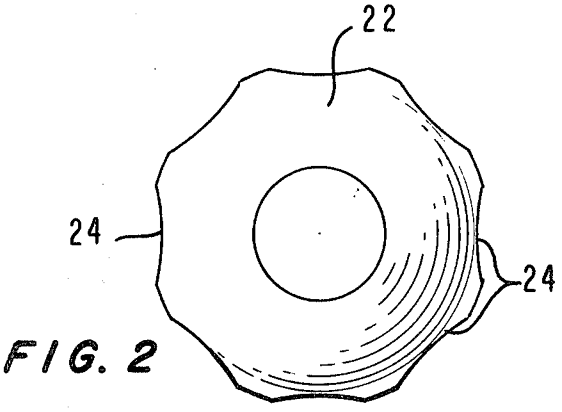
FIG. 2 is a top plan view of the ratchet handle of FIG. 1.
Figure 1:
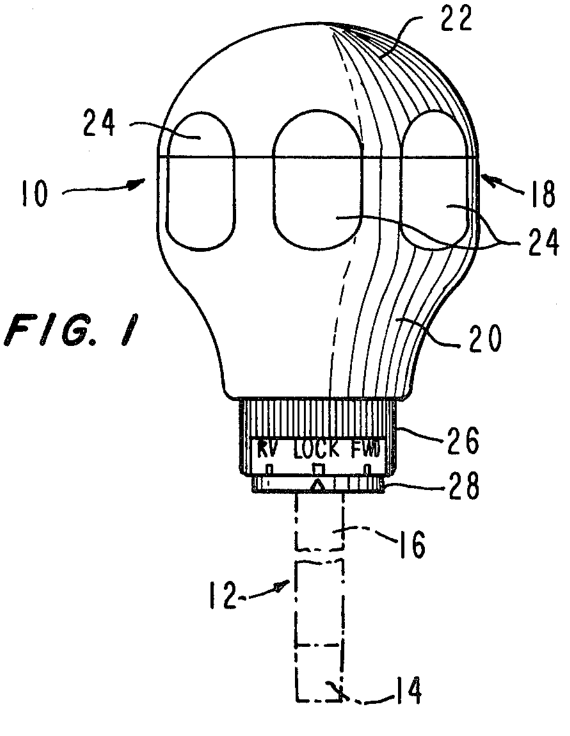
FIG. 1 is a front elevational view of a ratchet handle embodying the invention, a screwdriver blade being shown in phantom.
Figure 5A:
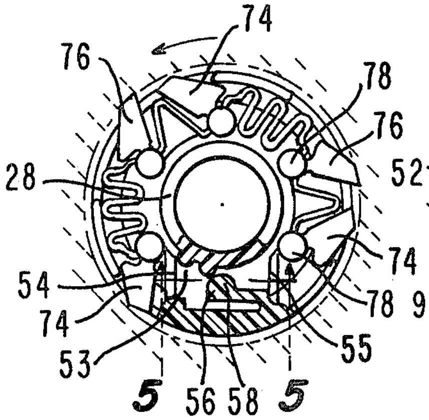

FIG. **5*a* is a top view of the ratchet handle of FIG. 1** illustrating the reverse position, the top cover portion being removed, parts of the drawing being broken away to show portions in section;

FIG. **5*b* is a partial front view illustrating the position of FIG. 5*a*, parts of the drawing being broken away to show the section along line 5—5 of FIG. 5*a*;**

Figure 6A:
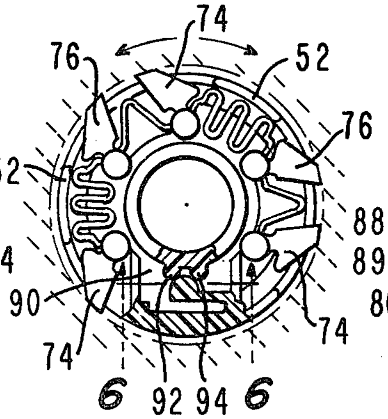

FIG. **6*a* is a top view of the ratchet handle of FIG. 1** illustrating the lock position, the top cover portion being removed, parts of the drawing being broken away to show portions in section;

FIG. **6*b* is a partial front view illustrating the position of FIG. 6*a*, parts of the drawing being broken away to show the section along the line 6—6 of FIG. 6*a*;**

Figure 7A:
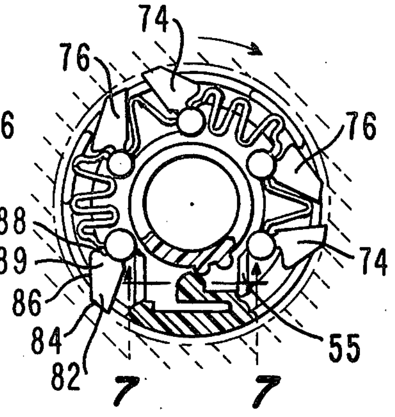
Figure 5B:
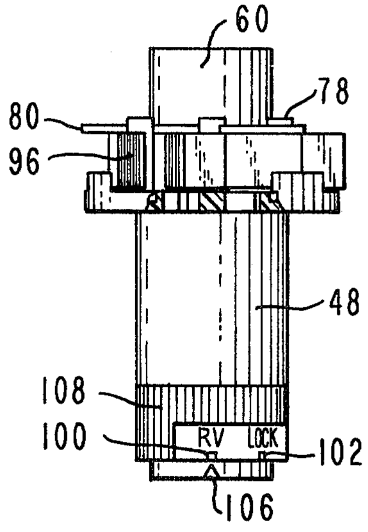
Figure 7B:
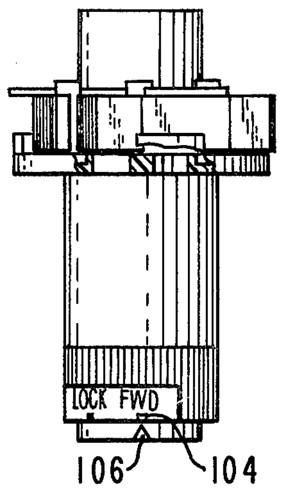

FIG. 7*a* is a top view of the ratchet handle of FIG. 1 illustrating the forward position, the top cover portion being removed, parts of the drawing being broken away to show portions in section; and FIG. 7*b* is a partial front view illustrating the position of FIG. 7*a*, parts of the drawing being broken away to show the section along the line 7—7 of FIG. 7*a*.

Figure 8:
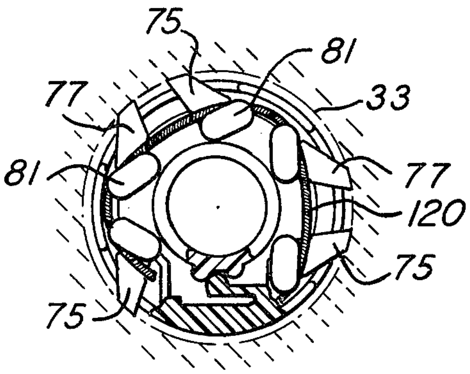
Figure 9:
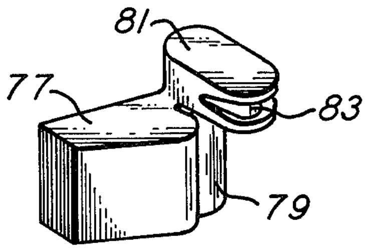

FIG. 8 is a top view of an embodiment of the ratchet handle of FIG. 1 employing a garter spring arrangement illustrating the lock position, the top cover portion being removed, parts of the drawing being broken away to show portions thereof in section;

FIG. 9 is a perspective view of a pawl of the ratchet handle embodiment of FIG. 8.

DETAILED DESCRIPTION

With reference to FIG. 1, a ratchet handle shown generally as 10 is illustrated in conjunction with a screwdriver shown generally as 12 having a blade portion 14 and a shank portion 16. Ratchet handle 10 is of substantially an elongated spherical or teardrop shape having a housing 18 which exteriorly constitutes the knob or handle and comprises base 20 and a hemispherical cover 22. To facilitate the grip and the external application of a torque, a plurality of depressions 24 are arranged circumferentially around the exterior of housing 18. The depressions 24 which may be slightly concave surfaces extend vertically at the exterior sides of both base 20 and cover 22.

Figure 3:
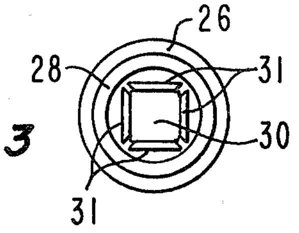
FIG. 3 is a bottom view of the lower portion of the ratchet handle of FIG. 1.

A cylindrical portion of shifter assembly 26 protrudes outwardly through the bottom of base 20. A drive assembly 28 concentrically received in shifter assembly 26 slightly protrudes below the bottom of shifter assembly 26. Drive assembly 28 receives the shank 16 of the screwdriver through a substantially square aperture 30, as illustrated in FIG. 3. Four resilient gripping fingers 31 extend to engage shank 16 and secure same in drive assembly 28. In preferred form, the cross-section of shank 16 is substantially commensurate with the dimensions and shape of aperture 30. Aperture 30 and the shank cross-section may assume a variety of shapes, preferably of a polygonal form so that rotation of drive assembly 28 about a central vertical axis presents a positive driving surface acting on shank 16 to produce a corresponding rotation of screwdriver 12.

Figure 4:
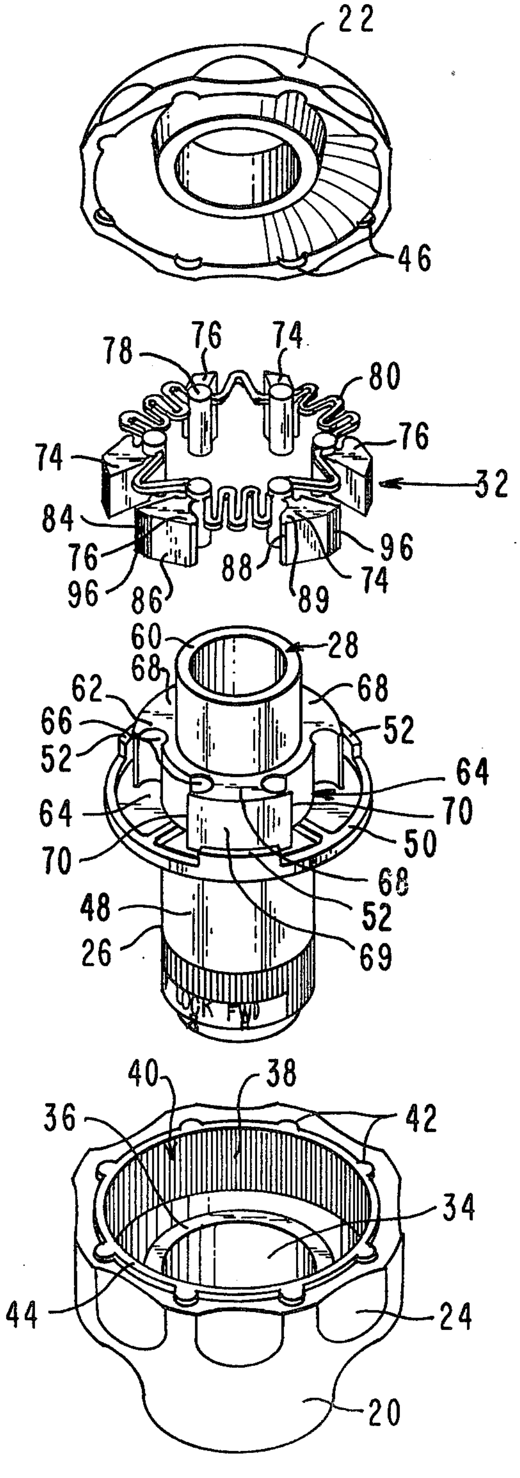
FIG. 4 is an exploded view of the ratchet handle of FIG. 1.

With reference to FIG. 4, the ratchet handle 10 may be efficiently assembled from as few as five components each of which may be manufactured by injection molding process. In general terms, base 20 receives shifter assembly 26 which generally functions to shift the ratchet handle to one of three ratchet drive directional modes. Drive Assembly 28, which generally functions to provide the direct drive to screwdriver 12, is illustrated in FIG. 4 in journaled relationship with shifter assembly 26. Pawl assembly 32 selectively engages between drive assembly 28 and base 20 to provide the ratchet drive. Cover 22 locks with base 20 to secure and enclose shifter assembly 26, drive assembly 28 and pawl assembly 32.

With reference to FIG. 4, base 20 is provided with a substantially cylindrical base sleeve 34 which terminates at the top to form a circular rim 36. A plurality of parallel teeth 38 extend longitudinally around the circumference at the top interior of base 20 to partially define base cavity 40.

A plurality of projections 42 extend from locking rim 44 which is positioned at the top of base 20. The lower interior portion of cover 22 is provided with a plurality of recesses 46 which complement projections 42 to provide an efficient snap-type locking engagement between cover 22 and base 20.

Shifter assembly 26 comprises a cylindrical sleeve 48 which is concentrically received in base sleeve 34 and rotatable therewith. A radially extending collar 50 projects from sleeve 48 to rest on rim 36. Collar 50 is dimensioned to have a diameter slightly less than the diameter of base cavity 40. In a preferred form, three equally space substantially identical ears 52 project upwardly at the periphery of collar 50. With reference to FIGS. 5*a*, 6*a* and 7*a*, a recessed portion 53 of collar 50 is partially defined by stops 54 and 55. A resilient tab 56 extends into portion 53 from proximate stop 55. Detent 58 on tab 56 is yieldingly biased inwardly by tab 56 to interact with drive assembly 28 as described below.

Drive assembly 28 comprises a cylindrical drive shaft 60 and a hub 62 which extends outwardly from the circumference of a portion of shaft 60. Drive assembly 28 is slidably received in sleeve 48 so that the bottom of hub 62 rests on the top of collar 50 and the bottom portion of shaft 60 protrudes slightly below sleeve 48.

Hub 62 may be described as a symmetrical annular structure of uniform thickness of which three congruent equally spaced arcuate portions have been removed to form pawl receptacles 64 at the radial periphery of the hub 62. A pair of opposing arcuate channels 66 further define the ends of each pawl receptacle 64. Three extended portions 68 of hub 62 radially terminate in arcuate surfaces 69 partially defined by finger-like end structures 70 adjacent the arcuate channels 66.

An integral pawl assembly 32 comprises three pairs of pawls interconnected by a serpentine spring 80, each consisting of a right-hand pawl 74 and a left-hand pawl 76. Pawls 74 and 76 extend from cylindrical shoulders 78. The serpentine spring 80 connects proximate the tops of each of shoulders 78. Spring 80 acts to torsionally bias apart the ends opposite shoulders 78 of opposing right-hand and left-hand pawls of each of the three pawl pairs.

Shoulders 78 are dimensioned and spaced from each other by spring 80 so that each shoulder 78 is received in a corresponding channel 66, with each of the three pawl receptacles 64 of hub 62 receiving a right-hand pawl 74 and a left-hand pawl 76. The resilient structure of spring 80 allows for a limited degree of rotation of shoulders 78 in channels 66. When pawl assembly 32 is correctly positioned relative to hub 62, portions of spring 80 rest on the top of extended portions 68 of the hub.

With reference to FIGS. 4, 5*a*, 6*a*, and 7*a*, each pawl comprises an arm 82 radially terminating at a clutch surface 84 obliquely adjacent to a disengagement surface 86 which together with lobe 88 defines an offset portion 89 of each pawl. Each pawl is of a uniform thickness substantially commensurate with the thickness of hub 62. When pawl assembly 32 is received in hub 62, shoulders 78 extend slightly above hub 62 proximate points of interconnection between shoulders 78 and spring 80 so that portions of serpentine spring 80 rest on extended portion 68 of the hub. Each arm 82 is dimensioned to extend radially outward slightly beyond the collar 50 of the shifter assembly 26. Each clutch surface 84 is adapted to engage and mesh with ratchet teeth 38 of base 20. In preferred form, each clutch surface 84 is provided with a plurality of parallel vertical teeth 96 which are dimensioned and oriented to be engageable with complementary ratchet teeth 38.

With reference to FIGS. 5a, 5b, 6a, 6b, 7a and 7b, an engagement means shown generally as 90 is illustrated to show the three modes of locking interaction between drive assembly 28 which is concentrically positioned within shifter assembly 26. In the absence of engagement means 90, drive assembly 28 would otherwise be free to axially rotate unconstrained relative to shifter assembly 26, and shifter assembly 26 would be correspondingly relatively free to axially rotate unconstrained relative to base sleeve 34. A pair of projections 92 and 94 extend from drive shaft 60 below hub 62 to engage previously described detent 58. Detent 58 is yieldingly biased by means of resilient tab 56 so that detent 58 may be shifted to firmly engage at one of three positions relative to projections 92 and 94, as illustrated in FIGS. 5a, 6a and 7a.

Figure 6B:
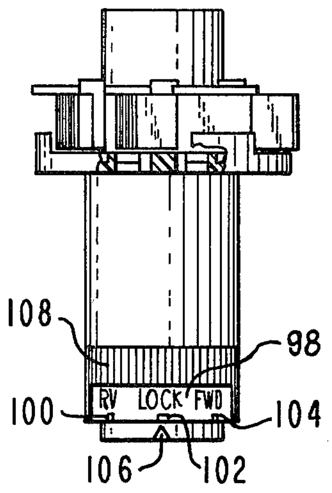

With reference to FIG. 6b, the lower portion of shifter sleeve 48 may be provided with a legend means 98 having three circumferentially spaced notches 100, 102 and 104 and appropriate notation corresponding with the three detent positions of FIGS. 5a, 6a and 7a. A notch 106 at the bottom of shaft 60 in alignment with notch 102 illustrates that the ratchet mechanism is in the "Lock" position. In the lock position as further illustrated in FIG. 6a, detent 58 is firmly engaged between projections 92 and 94. In the lock position, ears 52 do not contact pawls 74 or 76. All the pawls are urged by spring 80 substantially outwardly so that teeth 96 of clutch surfaces 84 mesh with ratchet teeth 38 of base 20.

In the case of a clockwise rotational force applied to housing 18, the primary transfer of rotational force from housing 18 to drive assembly 28, and hence screwdriver 12, occurs through pawls 74. Spring 80 urges pawls 74 in a clockwise rotational direction relative to shoulders 78 toward ratchet teeth 38 of base 20. The spring bias and the angular orientation of pawls 74 cooperates with the clockwise rotation of the teeth 38 to essentially wedge the clutch surfaces 84 of pawls 74 against the inside base and cause the ratchet teeth 38 to mesh with complementary teeth 96. Although teeth 96 of pawls 76 may also mesh with teeth 38, the angle of clutch surfaces 84 of pawls 76 is such that the clockwise rotational force of base 20 would tend to deflect pawls 76 inwardly. Naturally, the application to housing 18 of a counterclockwise rotational force from housing 18 will drive assembly 28 through pawls 76.

In the lock position, rotational force applied to housing 18 in the direction of either of the arrows of FIG. 6a is transferred through either pawls 74 or 76 (depending upon the direction of applied force) to portions of hub 62 proximate shoulders 78 to produce a torque on hub 62 relative the central vertical axis of hub 62.

Because hub 62 rigidly projects from drive shaft 60, the torque on hub 62 is translated as a rotational torque to screwdriver 12 which is axially received in the drive shaft 60. As illustrated in FIG. 6a, a rotational force applied to housing 18 in either the clockwise or counterclockwise direction results in a corresponding rotational force exerted at the blade of the screwdriver.

The "Reverse" position illustrated in FIG. 5a may be obtained by rotating the shifter assembly 26 relative to the drive assembly 28 so that notch 106 aligns with notch 100. A plurality of parallel vertical ribs 108 may be provided at the bottom circumference of the shifter sleeve 48 for gripping the shifter assembly to rotate same to obtain one of the three ratchet positions.

With reference to FIG. 5a, detent 58 is firmly engaged at the side of projection 94 opposite projection 92. Further rotation of detent 58 away from projection 94 is not possible since projection 92 abuts stop 54 at the end of recessed portion 53. As can be ascertained from the drawings, stops 54 and 55 essentially define the extent of rotation of shifter assembly 26 relative to drive assembly 28. Upon rotation of shifter assembly 26 relative to drive assembly 28, ears 52 move to contact disengagement surfaces 86 of the pawls 74 and force pawls 74 radially inward toward the opposing pawls 76 of each pawl pair so that teeth 96 of pawl 74 disengage from ratchet teeth 38 of base 20. As illustrated in FIG. 5a, rotation of the housing 18 in a counterclockwise direction shown by the arrow will result in a positive transfer of rotational motion through pawls 76, which are biased and angularly oriented so that teeth 96 mesh with teeth 38 and wedge against the inside of base 20 to transfer torque and produce corresponding counterclockwise rotation of screwdriver 12. The cooperation between lobe 88 and end structure 70 may also provide a reinforcement structure and prevent counterclockwise rotation of pawls 74 relative to shoulders 78. However, clockwise rotational motion applied to housing 18 will not result in any rotational motion being imparted to the screwdriver 12 because the angle of incidence of the clutch surface 84 of pawls 76 relative to clockwise-rotating teeth 38 deflects pawls 76 inwardly toward opposing pawls 74 and there is no cooperative structure to effectively limit the clockwise rotation of pawls 74 relative to shoulders 78. Thus, when the ratchet mechanism is in the reverse position, rotational motion of the screwdriver resulting from application of rotational force on housing 18 only occurs upon application of a counterclockwise force, in which case the screwdriver rotates in a counterclockwise direction.

The "Forward" position may be obtained by suitably rotating shifter assembly 26 so that notches 104 and 106 are in alignment and detent 58 is rotated to the side of the projection 92 opposite that of projection 94 as illustrated in FIGS. 7a and 7b. Further rotation away from projection 92 is not possible since projection 94 abuts stop 55 at the end of recessed portion 53.

The mechanical description of the operation of the ratchet handle in the forward position is analogous to the previous description relative to the reverse direction with the difference being in the direction of rotation. Ears 52 contact against disengagement surfaces 86 of pawls 76 to preclude engagement of teeth 96 of pawls 76 with teeth 38. Clockwise rotation applied to housing 18 in the direction of the arrow of FIG. 7a results in teeth 96 of pawls 74 wedging to mesh with teeth 38 to ultimately produce a corresponding clockwise rotation in screwdriver 12. The angle of incidence of clutch surface 84 of pawls 74 relative to clockwise rotation of teeth 38 prevents teeth 96 from effectively meshing with teeth 38 to transfer torque from the housing to the drive shaft. Thus, in the forward position screwdriver 12 rotates only in response to a clockwise force applied to housing 18.

A feature of the present invention which allows for the direction mode shift to be accomplished with one hand i.e., shifting by the fingers while the same hand grips the ratchet handle, is the timing relationship between the position of detent 58 relative to projections 92 and/or 94, as the case may be, and the subsequent interaction of ears 52 with the disengagement surfaces 86 of the pawls. When shifting to the "Reverse" or "Forward" direction modes the high point on detent 58 passes over center relative to the projections 92 or 94 before the ears 52 contact the pawls at disengagement surfaces 86 to disengage the respective like handed pawls. Thus, the resistance to shifting direction modes is substantially reduced.

Another embodiment of the ratchet handle which employs a garter spring/pawl arrangement as illustrated in FIGS. 8 and 9 is similar in description and operates in substantially the same manner as previously set forth except for the modifications set forth below. With reference to FIG. 8 pawl assembly 33 comprises three pairs of pawls each consisting of a right-hand pawl 75 and a left-hand pawl 77 as shown in FIG. 9. In contrast to the integral pawl/serpentine structure previously described, pawls 75 and 77 are separate components each having a cylindrical shoulder 79 which is received in a corresponding channel 66 of hub 62 in a manner analogous to that of the previously described embodiment.

A cap 81 at the top of shoulder 79 projects generally outwardly at an angle slightly oblique to pawl 75 or 77, as the case may be. Except for cap 81, each of pawls 75 and 77 are substantially similar in structure to the previously described pawls 74 and 76 and function in substantially the same manner to selectively engage ratchet teeth 38 of base 20 to provide a three direction mode ratchet drive. Cap 81 is further provided at its terminus with a groove 83 which is adapted to accommmodate a portion of garter spring 120 as illustrated in FIG. 8. The orientation of caps 81 is such that a single component i.e., garter spring 120, provides the requisite bias for all of the pawls of pawl assembly 33. Accordingly, garter spring 120 acts to bias apart the ends opposite shoulders 79 of opposing right-hand and left-hand pawls of each of the three pawl pairs.

The foregoing description illustrates a ratchet handle employing three pairs of opposing pawls. Although it is believed that optimum efficiency and durability are achieved by employing three pairs of opposing pawls, the invention encompasses any number of pairs of opposing pawls interacting to provide a three mode ratchet drive as previously described.

It may thus be seen that the objects of the invention set forth, as well as those made apparent from the foregoing description, are efficiently attained. While preferred embodiments of the invention have been set forth for purposes of disclosure, modifications of the disclosed embodiments thereof may occur to those skilled in the art. Accordingly, the appended claims are intended to cover all embodiments of the invention which do not depart from the spirit and scope of the invention.

We claim:

1. A ratchet handle for a hand tool comprising:
 a housing having a substantially cylindrical interior wall defined by a plurality of ratchet teeth;
 a shifter having a sleeve received in said housing with substantially circular platform extending therefrom, said platform having a plurality of equally spaced ears at the periphery thereof;
 a drive means journaled on said sleeve for limited relative rotation therewith; and
 pawl means to provide a selective rotational drive connection between said housing and said drive means said pawl means comprising a plurality of pairs of right- and left-hand pawls rotatably biased by a single spring to engage said ratchet teeth, said shifter ears being adapted to selectively interact with like-handed pawls to prevent their engagement with said ratchet teeth.

2. A ratchet handle for a hand tool comprising:

a housing having a substantially cylindrical interior wall defined by a plurality of ratchet teeth;
 a shifter rotatably received in said housing comprising a platform extending from a sleeve, said platform having three equally spaced ears;
 a drive means received in said sleeve and rotatable to three positions relative thereto; and
 an integral pawl means to provide selective rotational drive between said housing and said drive means, said pawl means comprising three pairs of right- and left-hand pawls interconnected and biased by a spring to engage said ratchet teeth, each of said three positions corresponding with selective interaction of said ears with said pawls.

3. A ratchet handle for a hand tool comprising:
 a housing having a substantially cylindrical interior wall defined by a plurality of parallel longitudinal teeth;
 a shifter received in said housing, said shifter comprising at least one ear;
 a drive means concentrically received by said shifter and adapted to receive the shank of the hand tool, said shifter being rotatably shiftable to each of three positions relative to said drive means; and
 pawl means mounted on said drive means to selectively provide a rotational drive connection between said housing and said drive means, said pawl means comprising at least one pair of opposing pawls, each having a substantially cylindrical shoulder, and a serpentine spring integral with said shoulders and urging said pawls to engage said housing teeth, said shifter ear being adapted to selectively interact with said pawl means.

4. The ratchet handle of claim 3 wherein said drive means comprises a hub having channels, said shoulders being received in said channels and rotatable therein.

5. The ratchet handle of claim 4 wherein said spring urges said pawls to engage said housing teeth by means of a rotational bias exerted by said spring on said shoulder.

6. A ratchet handle for a hand tool comprising:
 a housing having a substantially cylindrical interior wall defined by a plurality of parallel longitudinal teeth;
 a shifter received in said housing, said shifter comprising at least two ears;
 a drive means received by said shifter and adapted to receive the shank of the hand tool, said shifter being rotatably shiftable to each of three positions relative to said drive means; and
 pawl means mounted on said drive means to selectively provide a rotational drive connection between said housing and said drive means, said pawl means comprising at least two pairs of opposing pawls, said pawls being urged to engage said housing teeth by a single spring, said shifter ears being adapted to selectively interact with said pawl means.

7. The ratchet handle of claim 1 wherein said spring is a garter spring.

8. The ratchet handle of claim 1 wherein said shifter further comprises a detent engageable with a pair of projections on said drive means.

9. The ratchet handle of claim 1 wherein said spring has a serpentine form, said spring being integral with said pawls.

10. The ratchet handle of claim 1 wherein said spring urges apart the ends of opposing pawls of each pawl pair.

11. The ratchet handle of claim 1 wherein said shifter has three ears and said pawl means has three pairs of pawls.

12. The ratchet handle of claim 11 wherein said drive means comprises a shaft and a hub circumferentially projecting from said shaft, said pawl means being received in said hub.

13. The ratchet handle of claim 11 wherein each of said pairs of opposing pawls consists of a right-hand pawl and a left-hand pawl, and at a first position of shifter and drive means all pawls engage said housing teeth, at a second position of shifter and drive means only right-hand pawls engage said teeth, and at a third position of shifter and drive means only left-hand pawls engage said teeth.

14. The ratchet handle of claim 13 wherein said shifter ears interact with said left-hand pawls in said second position and said right-hand pawls in said third position to prevent pawl engagement with said teeth.

15. The ratchet handle of claim 14 wherein said shifter further comprises a detent rotatably engageable with a pair of projections on said drive means, said ears interacting with said pawls to prevent pawl engagement with said teeth only subsequent to said detent rotating overcenter relative to one of said projections.

* * * * *